J. H. HOPKINS.
INTERNAL COMBUSTION ENGINE.
APPLICATION FILED AUG. 31, 1909.

956,967.

Patented May 3, 1910.
6 SHEETS—SHEET 1.

Witnesses.
N. Meem
F. Jerdone Jr.

Inventor.
James Henry Hopkins
By Mason Fenwick & Lawrence
Attorneys

J. H. HOPKINS.
INTERNAL COMBUSTION ENGINE.
APPLICATION FILED AUG. 31, 1909.
956,967.
Patented May 3, 1910.
6 SHEETS—SHEET 3.
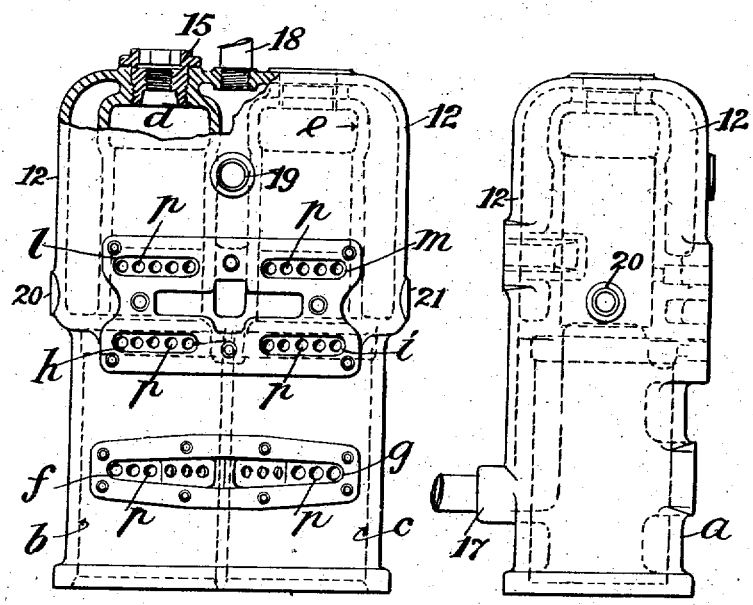
Fig. 3.
Fig. 5.
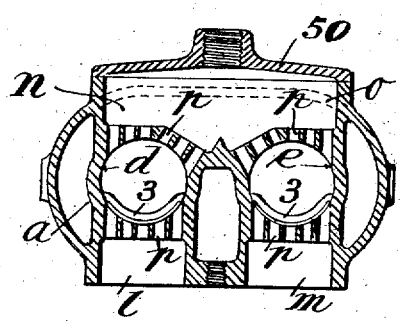
Fig. 4.
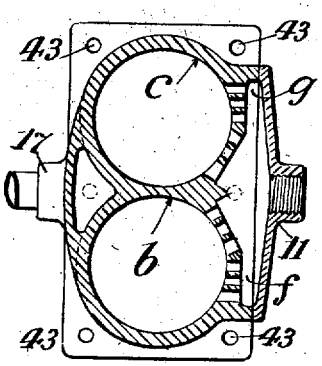
Fig. 6.
Witnesses.
N. Meem
F. Jerdone Jr.
Inventor.
James Henry Hopkins
By Mason Fenwick Lawrence
Attorneys

J. H. HOPKINS.
INTERNAL COMBUSTION ENGINE.
APPLICATION FILED AUG. 31, 1909.

956,967.

Patented May 3, 1910.
6 SHEETS—SHEET 4.

Witnesses
N. Meem.
F. Jerdone Jr.

Inventor.
James Henry Hopkins
By Mason Fenwick & Lawrence
Attorneys.

J. H. HOPKINS.
INTERNAL COMBUSTION ENGINE.
APPLICATION FILED AUG. 31, 1909.

956,967.

Patented May 3, 1910.
6 SHEETS—SHEET 5.

Witnesses
N. Meem
F. Jerdone Jr.

Inventor
James Henry Hopkins
By Mason Fenwick & Lawrence
Attorneys

J. H. HOPKINS.
INTERNAL COMBUSTION ENGINE.
APPLICATION FILED AUG. 31, 1909.

956,967.

Patented May 3, 1910.
6 SHEETS—SHEET 6.

Witnesses:
N. Meem
F. Jerdone Jr.

Inventor.
James Henry Hopkins.
By Mason Fenwick & Lawrence,
Attorney.

UNITED STATES PATENT OFFICE.

JAMES HENRY HOPKINS, OF MANCHESTER, ENGLAND.

INTERNAL-COMBUSTION ENGINE.

956,967.

Specification of Letters Patent. Patented May 3, 1910.

Application filed August 31, 1909. Serial No. 515,535.

*To all whom it may concern:*

Be it known that I, JAMES HENRY HOPKINS, a subject of Great Britain, residing at Manchester, in the county of Lancaster, Kingdom of Great Britain, have invented new and useful Improvements in and Connected with Internal-Combustion Engines, of which the following is a specification.

My invention relates to improvements in and connected with that type of internal combustion engines operated by gas, vapor, oil or the like, having cylinders of differential bores and pistons therein arranged tamden which engines are known as two stroke and valveless engines and wherein the large bore or cylinder is used as pump space to receive and compress the charge and in the small bore or cylinder farthest away from the crank shaft an explosion takes place on the out stroke of the piston every revolution of the crank shaft.

My invention has chiefly for its object to provide an improved arrangement of cylinders, pistons, ports and pipes whereby the said type of engine is rendered more efficient and reliable in action than hitherto has been the case.

I attain this object by the mechanism illustrated in the accompanying six sheets of drawings, in which—

Figure 1:
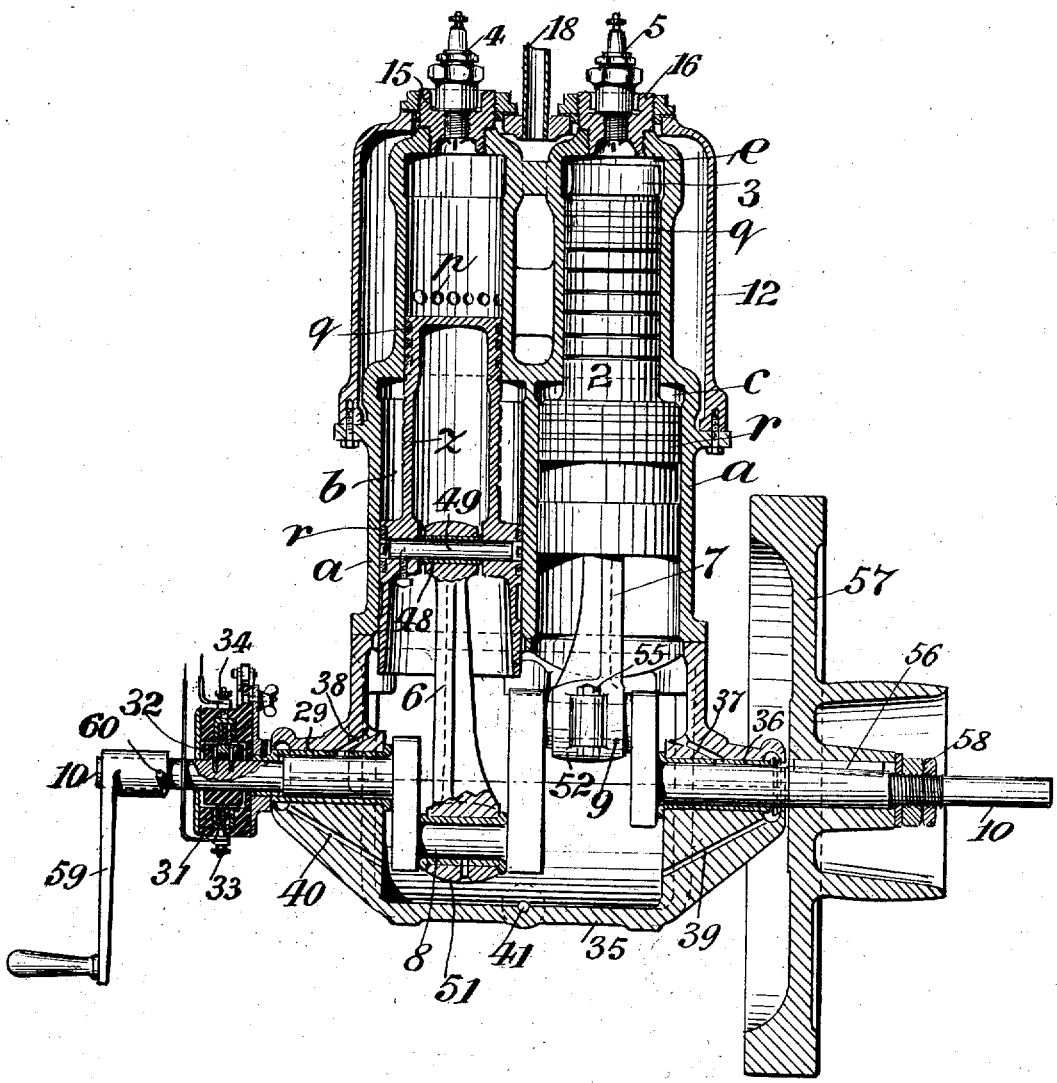
Figure 2:
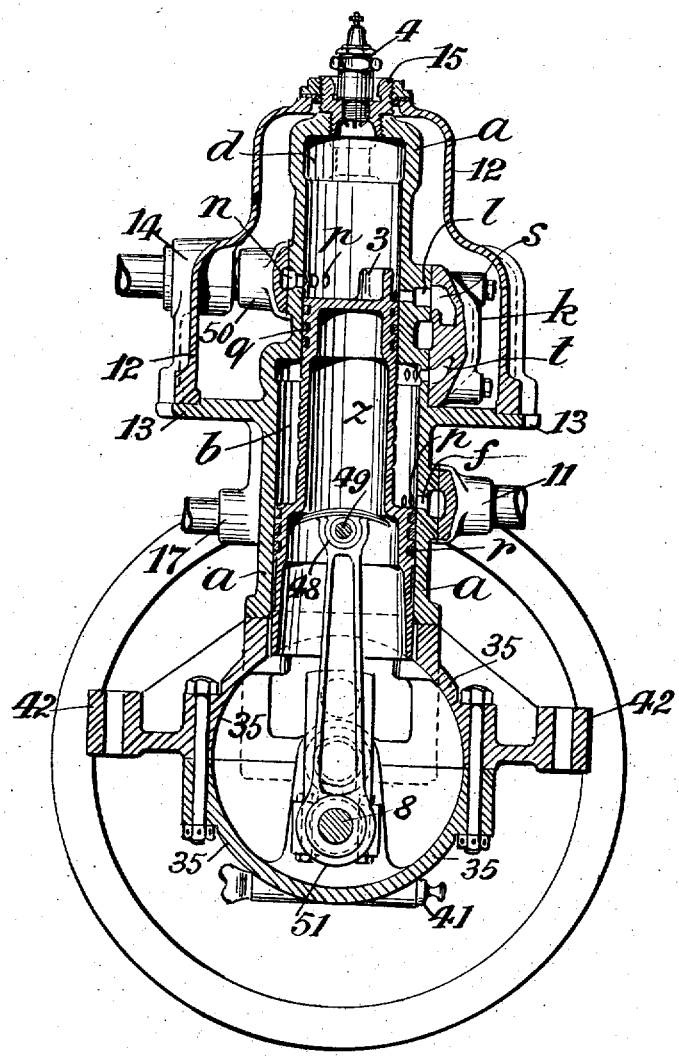
Figure 7:
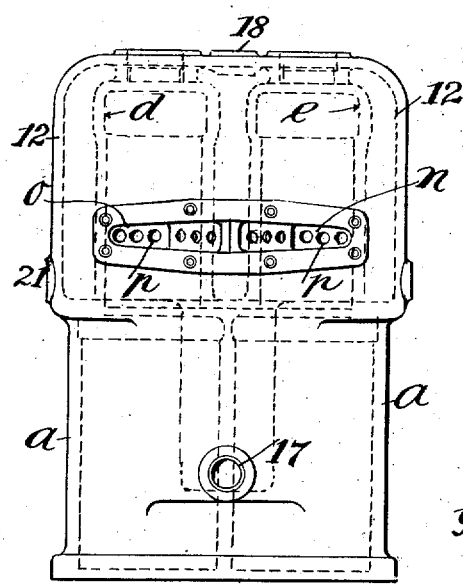
Figure 9:
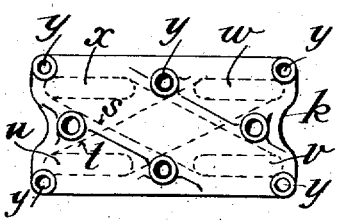
Figure 10:
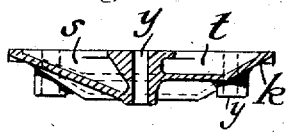
Figure 11:
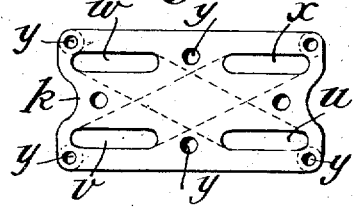
Figure 8:
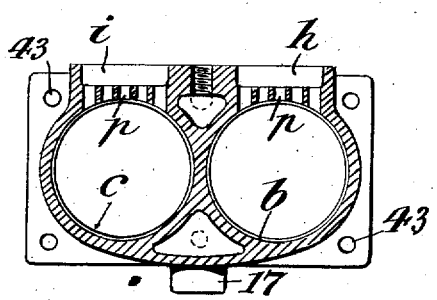
Figure 12:
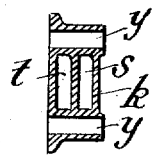
Figure 13:
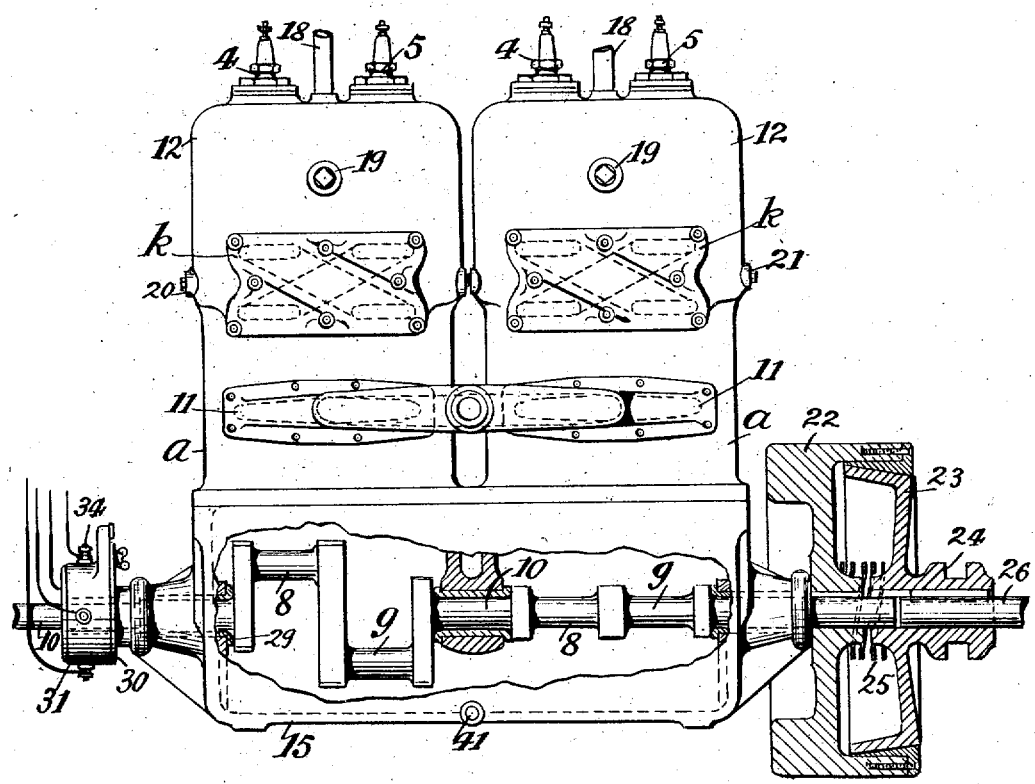
Figure 14:
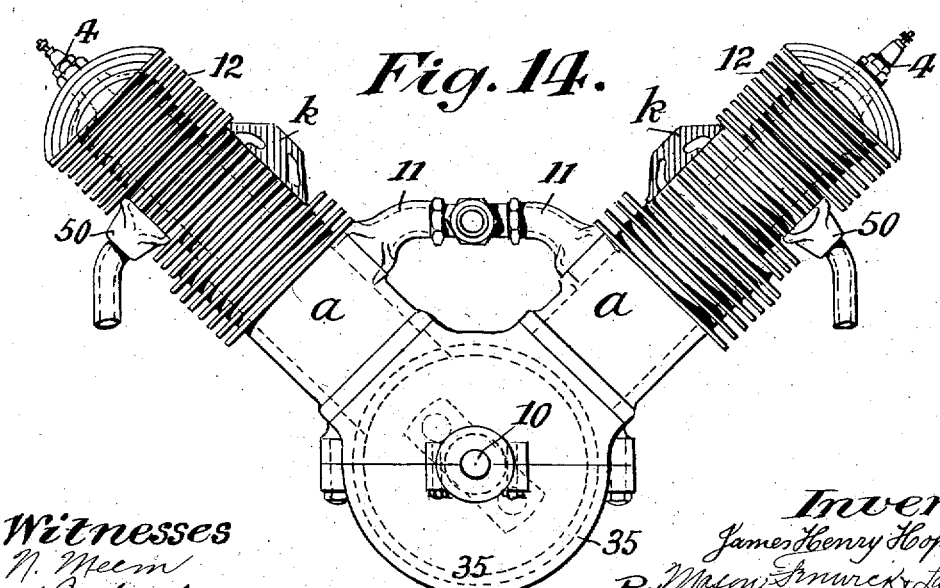
Figure 15:
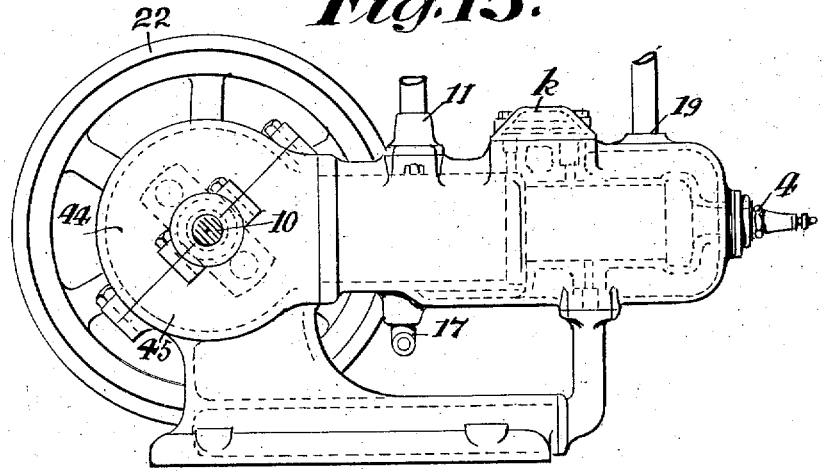
Figure 16:
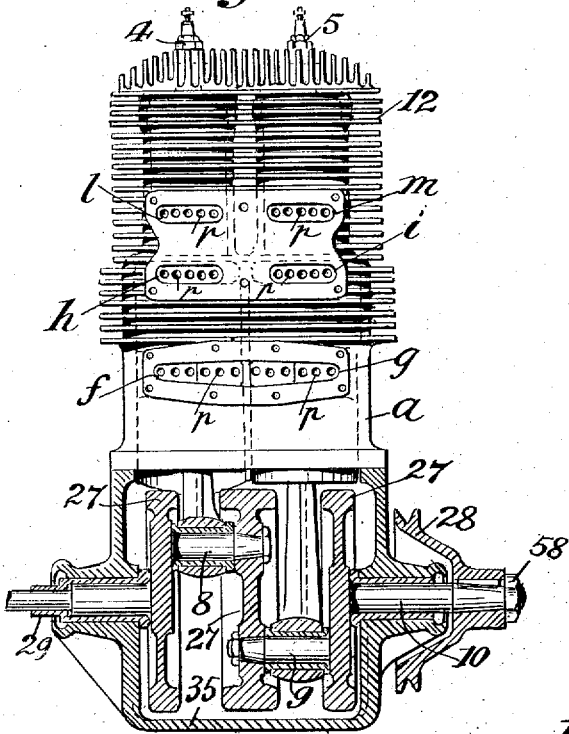

Figure 1 is a sectional front elevation of a vertical type of engine constructed in accordance with one embodiment of my invention showing the formation and also the relative position of the double trunk pistons to the cranks, a detachable water jacket, an electric contact breaker and provisions for sparking plugs. One piston is shown in section and the other as an outside view. Fig. 2 is a vertical sectional end elevation of Fig. 1 through one of the differential bores of the cylinder and through one of the double trunk pistons and cross over connection piece, inlet and exhaust connections, and also showing the position of ports in relation to the piston position. Fig. 3 is a front elevation of the twin cylinder of differential bore showing the relative position of the ports and their formation, also provision for the sparking plugs or hot tubes and the communication to the water jacket space and water jacket cast with the cylinder and not detachable as is the case in Figs. 1 and 2. Fig. 4 is a horizontal section of Fig. 3 through the small diameter bores usually termed the explosion chambers and the inlet and exhaust ports. Fig. 5 is an end elevation of Fig. 3 showing the port faces and the exhaust port and water inlet connection preferably arranged on same side of the cylinder. Fig. 6 is a horizontal section of Fig. 5 through the large diameter bores usually termed the pump chambers and its inlet port showing also the water connection inlet and holding bolt holes. Fig. 7 is a rear side elevation of Fig. 3 showing the position of the exhaust ports and the water connection. Fig. 8 is a horizontal section of Fig. 7 through the pump chambers and outlets which communicate with the cross-over connection piece. Fig. 9 is a front elevation of the double cored cross-over connection piece showing a means of fastening same to the twin cylinders. Fig. 10 is a horizontal section of Fig. 9 through one set of ports and part section through its passages. Fig. 11 is a rear side elevation of Fig. 9 showing the position of the openings which correspond to those of the cylinder. Fig. 12 is a vertical sectional end elevation of Fig. 9 through the middle showing the position of the passages and two holes for bolts or studs. Fig. 13 is a front elevation showing a combination of two pairs of twin cylinders constructed in accordance with my invention and arranged as is usual in motor car and launch engine practice, namely along the crank shaft. Fig. 14 is an end elevation of a combination of two pairs of twin cylinders constructed in accordance with my invention and set at an angle of 90 degrees to each other. Fig. 15 is a side elevation of a twin cylinder combination constructed in accordance with my invention suitable for a stationary type of engine. Fig. 16 is a front elevation of an air cooled engine constructed in accordance with my invention with the front port connections removed and provided with a combination crank and flywheels built up to suit the positions of the trunk pistons and inclosed in the crank case as is the usual practice in motor cycle engines and the like.

Similar characters refer to similar parts throughout the several views.

In carrying out my invention and referring to Sheets I, II, III, and IV, *a* is the twin cylinder casting, *b*, *c* are the larger diameter bore pump spaces, *d*, *e* the explosion chambers. The pump spaces *b*, *c* serve also for the first stage compression of the mixture previous to the entrance to the explosion spaces $d$, $e$ which are smaller in diameter than the said pump spaces.

$f$, $g$, Figs. 2, 3 and 6 are the mixture inlet ports to the pump spaces $b$, $c$ from the carbureter or other supply.

$h$, $i$ Figs 2, 3 and 8 are the outlet ports from pump spaces after first compression and communicate with the double cored cross-over connection piece $k$, Sheets II, III, and IV.

$l$, $m$ are the inlet ports from cross-over connection piece $k$ to the explosion chambers $d$, $e$.

$n$, $o$ Figs. 2, 4 and 7 are the exhaust ports allowing escape of burned gases and the like from the said explosion chambers. The actual communication between cylinder bore and ports of pump and explosion chambers are preferably made as shown by drilling a series of holes $p$. These holes dividing up the burned gases, a muffling effect is produced which greatly assists the silencing of the engine. They also offer the least possible obstruction to the traverse of the piston rings $q$, $r$, Figs. 1 and 2 in the explosion chambers and pump spaces respectively. These rings cannot get jammed as would be possible if the ports $f$, $g$, $l$, $m$, $n$, $o$, were of slot formation where they break through into the cylinder bores. The outside of these ports is preferably cored of slotted formation for some depth leaving the metal flat and at right angles to the line of drilling through to the cylinder spaces. The double cross-over connection piece $k$ is arranged with two independent cored passages $s$, $t$, Figs. 2, 9 and 10, communicating with openings $u$, $w$, and $v$, $x$, Figs. 9 and 11. These passages cross each other from right to left, namely $u$ to $w$ and left to right $v$ to $x$. They do not in any way communicate with each other. The openings $u$ and $v$ are placed over the outlets from the pump spaces $h$, $i$ and the openings $w$ and $x$ fit over $l$ and $m$ of the explosion chambers. It will thus be seen that the left hand pump space $b$ controls the right hand explosion chamber $e$ and pump space $c$ in working with the explosion chamber $d$. Provision is made for attaching the cross-over connection piece $k$ to the cylinder $a$ by means of studs, bolts or the like through holes $v$.

I may here remark that it is not absolutely necessary that the inlets $f$, $g$ to the pump spaces $b$, $c$ be on the same side of the casting as the double cross-over connection piece $k$. These inlets may be placed on the same side as the exhaust outlets $n$ and $o$ and in this position in some cases would be in a much better position when say heat from exhaust pipe is used for warming the air supply to the carbureter or even assisting to vaporize the liquid fuel used for combustion. When placed on this side the water inlet may be arranged just above the inlets $f$, $g$.

$z$ and 2, Figs. 1 and 2 are the double trunk pistons, the large diameter part causing the vacuum for taking in the mixture, also the first compression of the mixture in the pump spaces $b$ and $c$ and the small diameter part the final compression of the mixture and the exhaust of burned gases in the explosion spaces $d$, $e$. The upper ends of both diameters of the double trunk pistons $z$ and 2 are fitted with split spring rings $q$ and $r$ to form a gas tight connection between the walls of the cylinder and so assist the pumping and compressing and to also take up wear for some considerable time when they may be renewed to again bring about satisfactory running conditions. The upper end of pistons $z$ and 2 are provided with a deflector or strip of metal 3, Figs. 1, 2 and 4, opposite to the inlet ports $l$, $m$, these deflectors act as a baffle between the incoming charge of mixture and the open exhaust ports $n$, $o$ at the opposite side. They also act as a guide to the mixture and deflect it in an upward direction toward the sparking plugs 4, 5 Figs. 1 and 2 (or their equivalent hot tubes). Thus the incoming mixture charge assists in driving forward toward the exhaust ports the remaining burned gases and so scavenging the explosion chambers.

6 and 7 are the connecting rods conveying the impulses from the pistons $z$ 2, to crank pins 8, 9 of the crank shaft 10. It will be noted that the crank pins 8, 9 are placed directly opposite each other, namely at 180 degrees. They then control the pistons $z$ and 2 so that when one is in the extreme top position, the other is in the extreme out position, under these conditions the pistons $z$ and 2 work in relation with the ports $f$, $g$, $h$, $i$, $l$, $m$, $n$, $o$, and correctly handle the mixture without making use of any other mechanism such as cams, half speed shafts, tappets, valves, sliding sleeves and the like.

The engine described operates as follows:—The piston $z$ being at its extreme out stroke has caused a vacuum in pump space $b$ and immediately it uncovers the mixture inlet port $f$ the gases will be drawn inside the pump space $b$, as the piston $z$ travels upward it covers port $f$ and compresses the mixture between the large diameter part of piston and the top of pump space $b$. At the moment the piston $z$ arrives at the top of the stroke, the other piston 2 has got to the bottom or extreme out stroke, now at this moment the piston 2 uncovers port $m$ and as the passage $t$ in the crossover connection piece $k$ communicates with port $m$ the mixture under compression passes over to the other explosion chamber $e$. The piston 2 now moving upward locks up the mixture in the explosion chamber *e* and compresses it until the piston 2 arrives at the top of its stroke, about this moment the mixture or gases are fired either by the electric spark plug 5 (or hot tube, or other suitable device). The gases now expanded drive the piston 2 downward and finally escape through port *o* just previous to the piston 2 arriving at the bottom of its stroke and just before it uncovers again the inlet port *m* for the next charge. Each piston is performing a similar function for its neighbor.

The pistons *z* and 2 being arranged to drive on to the crank pins 8, 9 placed at opposite angles and also both pistons and their connections being alike, it will be quite readily seen that the moving parts being of equal weight, they form in themselves a running balance of moving parts and so greatly reduce the vibration as compared with many types of engines of this class.

The inlet ports *f*, *g* are covered by a connection piece 11, Fig. 2 arranged for coupling up to a carbureter or similar mixture supply. The connection piece 11 supplies both sets of pump space inlet ports *f*, *g*. The exhaust ports *n*, *o* are also fitted with a similar connection piece 50 which will allow of the burned gases from both ports being conveyed by one pipe to a silencer or as in launch work under the water.

In Figs. 1 and 2 the water cooling jacket 12 is shown of a detachable form and may be made of sheet metal, aluminium or metal alloy when weight is a consideration, the base being bolted to a circular flange 13 cast in one with the cylinders. A packing gland 14 is provided to allow the exhaust pipe to come outside and to make a water tight joint around the pipe. At the top around the sparking plugs 4, 5 which are fitted with adapters 15, 16 is a packing washer and nut. The adapters 15 and 16 are screwed into the top of explosion chambers *d*, *e* and tapped at their centers to take the spark plugs 4, 5 (or hot tubes), the outside is also screwed to take the nut to bind the packing washer. The water inlet 17 is part of the twin cylinder casing, there being provided a passage way from the inlet 17 to the upper side of flange 13. The water outlet is preferably as shown at 18 between the plugs 4 and 5 when the engine is a vertical one, and at 19 the opposite side to inlet when used horizontally.

Figs. 3, 4 and 5 show a water cooling jacket 12 cast in one with the twin cylinders, in this instance the inlet is at 17 and the outlets either at 18 or 19. At 20 and 21 are other outlets, these are to assist in locating the cores before casting and for the removal of the core sand after casting. They are finally plugged up and made water tight.

In Figs. 1 and 2 a suitable type of crank case 35 is shown jointed horizontally along the crank shaft and having a seating on its top side to take the twin cylinder casting. The cylinders are bolted down preferably by six studs or bolts, holes 43 for which are shown in Fig. 6. The crank case 35 is provided with bushes 36, 29 Figs. 1 and 2. Provision is also made for oil to get to the bearings 36 and 29 through passages 37 and 38 and also for any excess which flows outward to return to crank case along other passages 39, 40 and a drain and plugs 41 for running off oil from the crank case. The top half has feet 42, for bolting down to foundation, frame of car or the like.

In the engine shown in Fig. 13, a flywheel 22 is employed with a clutch connection 23 having a jaw piece 24 for manipulating the clutch 23, also a spring 25 for holding in the clutch when driving machinery or the like by the shaft 26. In this type of engine an inlet connection piece is arranged to attend to both sets of pump chambers so that one carbureter or motive fluid supply device will supply both pairs of cylinders. Cross-over connection pieces are also employed and the cranks of the two pairs of cylinders are at right angles to each other so that there is an even distribution of power to the crank shaft. Any number of pairs of cylinders may be arranged along a crank shaft, the cranks for each set being evenly spaced around the said shaft.

In Fig. 16 a crank shaft 10 is shown composed of three disks 27, which act as flywheels. The two outside ones may be either solid or built up with their crank pins and shaft parts or the crank pins may be fitted in a taper hole and keywayed and locknutted in the outside disks. If made in this manner the crank case could have removable ends to carry the bearings or be split in halves vertically instead of horizontally. The crank shaft 10 in this case is provided with a V belt pulley 28 as used for motor cycle and the like. The crank shaft bushing 29 carries on its outer end a stationary controlling back plate 30, to electric contact breaker 31. The front insulation body portion is arranged to be adjusted angularly about its contact drum or rotor 32 and it is shown carrying two contact plungers 33, 34. This attachment would have to be modified to suit the number of twin cylinders used.

In Figs. 14 and 16 an air cooling jacket 12 is shown in which case fins or gills of metal are cast on the walls of the cylinder to expose as much surface as possible and so assist the engine by air cooling its cylinder as is usual in motor cycle practice. These fins or gills might be modified in arrangements so as to present or expose more surface to air. Such modifications would depend on the position of the cylinders and their exposure to the air current.

The fins or gills might be detachable and of sheet metal, or they might be wires or any other suitable material which would adapt itself as a conductor of and distributer of heat.

In Fig. 14 the motive power inlet is arranged to both pairs of pump chambers so that same may be taken off one supply. The cross-over connection pieces $k$ are shown in part section. The position of the cranks as shown in this instance is such as will give a similar distribution of power to the crank shaft as those in Fig. 13. The position of the cylinders being now at 90 degrees brings about these conditions. Any number of pairs of cylinders either water cooled or air cooled may be arranged around a crank shaft, say 6 pairs, in which case they would stand at an angle of 60 degrees to each other completely surrounding the crank shaft. The crank pins would all be in the same plane and not set around the shaft in pairs as Fig. 13.

In Fig. 15 a crank case of 44, 45 is shown, the lower part 45 of which is in one piece with and forms also a foundation base and at the bottom 46 may be of box formation to serve as a silencer to receive the burned gases from the exhaust connection pipe 47. The loose part of the crank case 44 is jointed at an angle of 45 degrees, bolts or studs being arranged for holding the two parts 44 and 45 together.

On the underside of the twin cylinders are the water and exhaust connections and on the top side the motive power inlet, the cross-over connection piece and the water outlet. At the extreme outer end are the sparking plugs or hot tubes. On the exhaust port is a connection piece to take the burned gases into the base casing or silencer.

Referring to Figs. 1 and 2 again, the connecting rods 6, 7 are bushed at their upper ends 48 and are connected to the double trunk pistons $z$, 2 by crosshead or gudgeon pins 49 and at their lower ends are fitted caps 51, 52 which embrace split bushes 53, 54, and are held to the rods 6, 7 by bolts and lock nuts 55. The spark plugs 4, 5 (or hot tubes) may be arranged to screw direct into the twin cylinder bores instead of making use of adapters. This would often be the case with small air cooled engines. However, in larger engines the adapter holes will allow of a stiff boring bar being used when boring the cylinders instead of an unsupported boring tool which may be sufficiently strong when tooling small cylinders. The crank shaft 10 has its crank pins 8, 9 placed at opposite angles namely 180 degrees, provision being made at 56 to take flywheel 57 which is bored taper and keywayed, lock nuts 58 are fitted for safety. The other end of the crank shaft 10 carries the contact drum or rotor 32 of an electric contact arrangement 31 for controlling the ignition when spark plugs are used. 59 is the starting handle arranged adjacent thereto, a cross pin 60 providing the turning clutch abutment of the shaft 10 to the handle 59.

I wish it to be understood that I do not limit myself to any form or arrangement of crank case, type of crank shaft or flywheel combination or electrical equipment as herein described, or to the means of cooling the cylinders and other parts, for instance the upper half of the crank case may be in one casting with a cylinder of twin formation thus doing away completely with cylinder joint to the crank case, while the bottom half of the crank case may be provided with feet or lugs to fasten to the bed-plate or to the frame of a car or machine or it may in itself form the engine bed plate. The engine may also be readily adapted for use with oil vapor or carbureted vapor or gas as the combustible.

I am aware that previous to my invention internal combustion engines with valves have been made with large and small bore twin cylinders and in some cases cast integral with each other, also that compressed air has been transferred from the pump space of one set to the explosion chamber of the other set of the twin cylinders by ports arranged crosswise in the wall between the cylinders with or without valves which arrangement I do not claim.

I claim:

1. In an internal combustion engine, a pair of cylinders of integral twin formation and differential bores, a charge admission port in the wall of each large and an exhaust port in the wall of each small bore cylinder, means for linking the said two cylinder charge admission ports and exhaust ports respectively together, a joint charge admission pipe and a joint exhaust pipe connected with the respective linking means, a charge outlet port in the wall of each large and a charge inlet port in the wall of each small bore cylinder superposed above the said charge admission ports and means for crosswise connecting the said charge outlet and inlet ports and thereby transferring the charge from the large to the small bore cylinders, all combined substantially as and for the purpose set forth.

2. In an internal combustion engine, a pair of cylinders of integral twin formation and differential bores, a charge admission port in the wall of each large and an exhaust port in the wall of each small bore cylinder, means for linking the said two charge admission ports and exhaust ports respectively together, a joint charge admission pipe and a joint exhaust pipe connected with the respective linking means, a charge outlet port in the wall of each large and a charge inlet port in the wall of each small bore cylinder superposed above the said charge admission ports, the said ports consisting each partly of a slot and partly of a series of holes, all combined substantially as and for the purpose set forth.

3. In an internal combustion engine, a pair of cylinders of integral twin formation and differential bores, a charge admission port in the wall of each large and an exhaust port in the wall of each small bore cylinder, means for linking the said two charge admission ports and exhaust ports respectively together, a joint charge admission pipe and a joint exhaust pipe connected with the respective linking means, a charge outlet port in the wall of each large and a charge inlet port in the wall of each small bore cylinder superposed above the said charge admission ports and means for crosswise connecting the said charge outlet and inlet ports and thereby transferring the charge from the large to the small bore cylinders, the said means consisting of a cross over connection piece having two passages independently crossing each other and located over the said outlets from the pump chambers and inlets of the explosion chambers, all combined substantially as and for the purpose set forth.

4. In an internal combustion engine, a pair of cylinders of integral twin formation and differential bores, a charge admission port in the wall of each large and an exhaust port in the wall of each small bore cylinder, means for linking the said two charge admission ports and exhaust ports respectively together, a joint charge admission pipe and a joint exhaust pipe connected with the respective linking means, a charge outlet port in the wall of each large and a charge inlet port in the wall of each small bore cylinder superposed above the said charge admission port and means for crosswise connecting the said charge outlet and inlet ports and thereby transferring the charge from the large to the small bore cylinders, a double trunk differential piston in each cylinder, the large diameter piston of one of which during its outstroke creates a vacuum and at the end of its outstroke uncovers the said charge admission port and on its instroke compresses the charge in its cylinder before the small diameter piston in the explosion chamber of the other cylinder uncovers the respective inlet port, all combined substantially as and for the purpose set forth.

5. In an internal combustion engine, a pair of cylinders of integral twin formation and differential bores, a charge admission port in the wall of each large and an exhaust port in the wall of each small bore cylinder, means for linking the said two charge admission ports and exhaust ports respectively together, a joint charge admission pipe and a joint exhaust pipe connected with the respective linking means, a charge outlet port in the wall of each large and a charge inlet port in the wall of each small bore cylinder superposed above the said charge admission port and means for crosswise connecting the said charge outlet and inlet ports and thereby transferring the charge from the large to the small bore cylinders, a double trunk differential piston in each of the said cylinders, the small diameter piston of one of which during its outstroke first uncovers the respective exhaust port and at the end of its outstroke uncovers the respective inlet port to permit the compressed charge in the pump space of the opposite cylinder to enter the said explosion chamber for ignition, all combined substantially as and for the purpose set forth.

6. In an internal combustion engine, a pair of cylinders of integral twin formation and differential bores, a charge admission port in the wall of each large and an exhaust port in the wall of each small bore cylinder, means for linking the said two charge admission ports and exhaust ports respectively together, a joint charge admission pipe and a joint exhaust pipe connected with the respective linking means, a charge outlet port in the wall of each large and a charge inlet port in the wall of each small bore cylinder superposed above the said charge admission ports, a joint connection cover for the said inlet and the said exhaust port and a charge inlet pipe and an exhaust pipe on the said covers respectively, all combined substantially as and for the purpose specified.

In testimony whereof I have signed my name to this specification in the presence of two subscribing witnesses.

JAMES HENRY HOPKINS.

Witnesses:
ALFRED BOSSHARDT,
STANLEY E. BRAMALL.